US005456278A

United States Patent [19]

Morris et al.

[11] Patent Number: 5,456,278

[45] Date of Patent: Oct. 10, 1995

[54] UTILITY SHUTOFF KEY

[76] Inventors: Jeffrey B. Morris, 372 Longbranch Rd.; Michael K. Williams, 349 Longbranch Rd., both of Simi Valley, Calif. 93065

[21] Appl. No.: 235,981

[22] Filed: May 2, 1994

[51] Int. Cl.[6] .................. F16K 35/06

[52] U.S. Cl. .................. 137/1; 81/125.1; 81/176.1; 251/292

[58] Field of Search .................. 81/124.4, 124.7, 81/125.1, 176.1, 176.15, 176.2, 177.6; 137/1, 636, 636.2; 251/291, 292; 74/524, 544, 546, 547

[56] References Cited

U.S. PATENT DOCUMENTS

| | | | |
|---|---|---|---|
| 342,824 | 6/1886 | Clark | 81/125.1 |
| 554,846 | 2/1896 | Vincent | 81/124.7 |
| 1,003,997 | 9/1911 | Dudly, Sr. | 81/125.1 |
| 1,770,621 | 7/1930 | McElwee, Sr. et al. | 81/125.1 |
| 2,138,725 | 11/1938 | Brouhard | 81/177.6 |
| 4,823,651 | 4/1989 | England | 81/125.1 |

FOREIGN PATENT DOCUMENTS

| | | | |
|---|---|---|---|
| 2219234 | 5/1988 | United Kingdom | 81/124.7 |

*Primary Examiner*—George L. Walton

*Attorney, Agent, or Firm*—Walter Unterberg

[57] ABSTRACT

This invention is a dual shutoff key which is a single tool for shutting off both gas and water utilities. This capability is important in emergencies, such as approaching hurricanes or after an earthquake. The key consists of a main bar having a U-channel at one end for main water valve shutoff, and a skew slot for main gas valve shutoff. Hinged to the main bar is a lever bar which can swing out at right angles to the main bar to provide leverage when turning a normally tight or even corroded water valve. The main bar is long enough to reach down to below-ground water valves, and the lever bar is long enough to provide a torque of 150 foot-pounds. This enables persons with limited manual strength—such as children, the handicapped and the elderly—to shut off water.

For gas shutoff the main bar provides sufficient leverage and the lever bar is placed in the folded position adjacent to the main bar. The lever bar is held in place by detents in the folded position. For storage, the folded key can be suspended from the gas slot. A self-luminous band on the outside of the folded lever bar helps retrieval of the key from storage during dark when an emergency has knocked out electric lights. Steel construction makes for a sturdy shutoff key which can take the design torque without deformation. All surfaces of the shutoff key are made inert by a vinyl coating which eliminates potentially dangerous releases of surface vapors and arcing.

8 Claims, 2 Drawing Sheets

UTILITY SHUTOFF KEY

BACKGROUND OF THE INVENTION

This invention relates to shutoff keys for utilities such as gas and water, and particularly to shutoff keys which are capable of shutting off more than one utility.

When residential or commercial properties are left unoccupied for some length of time, it is prudent to shut off utilities such such as gas, water and electricity. This reduces the risk of escaping gas or water and electrical short or open circuits in case of fires, floods, hurricanes or earthquakes. Conversely, fire can be caused by escaping gas which could be ignited by an electrical spark.

Of special importance are cases where utilities must be shut off in haste, as in the case of an approaching hurricane or immediately after an earthquake. Whereas electricity can easily be shut off using convenient circuit breakers, the main shutoff valves for gas and water (located near the gas and water meters) have special, and different, shapes and need to be actuated manually with compatible keys.

Further, these main shutoff valves are not often touched and have a tendency to stick or actually corrode, requiring extra physical effort to turn them off. Persons with limited manual strength such as children, the handicapped and the elderly, require keys with large leverage to accomplish the task. When speed is important, one "dual" key capable of shutting off both gas and water main valves is an important asset.

Readily available in hardware stores are keys that fit either gas or water main valves, but not with large leverage. One example was found of a "dual" shutoff key marketed under the name "On Duty" that has openings for both gas and water valves; but it has the drawback that the leverage for gas is limited to about 9 inches, and there is no leverage for water, actuation consisting merely of rotating the hand holding the key. Further, many water valves are located below street level, requiring a key with a long vertical reach.

There is, then, a definite need for a dual shutoff key for gas and water with a long vertical reach for the water main valve. Further, such a dual key should have adequate leverage for persons of limited manual strength to be able to turn both the gas and water valves. The key itself should be rigid enough to move sticky or corroded valves without suffering any distortion or structural failure. Also, such a dual key should be retractable or foldable to take up minimum space when stored.

If an emergency arises during hours of darkness and electric lights fail, the key should be self-luminous so it can be found fast in the dark. The surface of the key should be inert. It should not release any toxic or combustible vapors from surface paints or coatings. If struck, it should be free from arcing which could lead to an explosion in a combustible gas atmosphere, typically created when leaking gas is present.

The utility shutoff key of the present invention embodies all the desirable features mentioned in the two previous paragraphs. It is described in the following Summary of the Invention and shown in the Drawings.

SUMMARY OF THE INVENTION

The shutoff key of this invention essentially comprises a main bar to which is hinged a lever bar. The main bar is eqipped with a U-channel at one end and a skew slot at the other end. The hinge is attached to the main bar a small distance inboard from the skew slot and perpendicular to the axis of the main bar. The lever bar is hinged at one of its ends to the main bar and is shorter than the main bar. The hinge arrangement permits the free end of the lever bar to swing from the folded position, where it lies adjacent to the main bar, through an arc of ninety degrees to the extended position, perpendicular to the main bar.

The U-channel end of the main bar is designed to fit snugly over the main water valve stem of a residential or industrial water supply system. With the U-channel in the engaged position, this stem can be turned to the shutoff position by rotating the main bar about its own axis. Since main water valves frequently are located below ground in a horizontal pipe connected to a subterranean water meter, the main bar must be long enough to reach vertically down from ground level. To accomplish this the length of the main bar is in the range from 1.5 to 2 feet.

To contain the high water pressure, main water valves are built with small clearances and are difficult to turn, and more so if they are also corroded. Therefore, leverage must be available to the operator, especially if he or she has limited manual strength. In this invention the leverage is provided by the lever bar which is swung into the extended position. A maximum torque of 150 foot-pounds is built into this shutoff key with a lever bar approximately one foot in length.

The structural integrity of the shutoff key under the maximum torque is assured by designing both bars and the hinge arrangement for high torsional and flexural rigidity and making all parts of steel. Further, to assure an inert surface with no surface vapor release or arcing, a vinyl coating is applied to the surface of all shutoff key components.

To shut off the main gas valve, the lever bar is swung into the folded position adjacent to the main bar, and the skew slot, which is designed to fit snugly around the main gas valve stem, is placed in that position. Since most main gas valves are next to gas meters which are above ground, the whole length of the main bar now acts as a lever in turning the valve stem.

For compactness in the folded position, the cross-section of the lever bar can be an open box shape, with all three inner surfaces fitting snugly over the main bar of rectangular cross-section. Further, to secure the lever bar to the main bar in the folded position, it can be made to releasably grip the main bar by means of detents in the side walls of the open box section.

For convenient storage, the folded shutoff key can be suspended from a vertical surface by a hook or nail engaging the skew slot. A self-luminous band, such as produced by a phosphorescent material, around the free end of the lever bar permits rapid access in the dark.

The dual shutoff key of the present invention can be tailored to variously shaped main water valve stems and main gas valve stems. A minimum width of 1.5 inches for the longer side of a rectangular cross-section of the main bar will accommodate any of the shapes found in the U.S.A.

BRIEF DESCRIPTION OF THE DRAWING

A better understanding of the invention may be gained by reference to the following Detailed Description in conjunction with the accompanying drawings, in which.

DETAILED DESCRIPTION OF THE PREFERRED EMBODIMENTS

Figure 1:
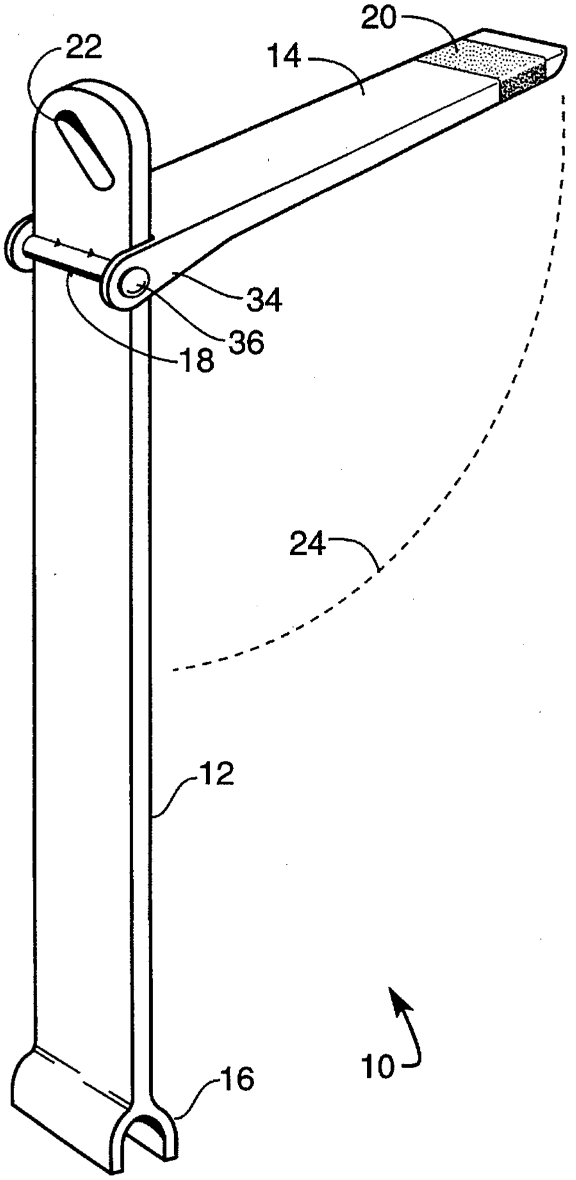
FIG. 1 is a pictorial view of the shutoff key in the extended position.

Referring to FIG. 1, the shutoff key 10, comprising main bar 12 and lever bar 14, is shown in the extended position. Shown in dashes is the arcuate locus 24 of the free end of hinged lever bar 14 as it swings out to the extended position. The main bar 12 is of rectangular cross-section and comprises U-channel 16 at one end, a 45-degree skew slot 22 at the other end, and hinge 18 just inboard of skew slot 22. Hinge 18 is a hollow cylinder attached perpendicular to main bar 12, typically by welding.

Figure 3:
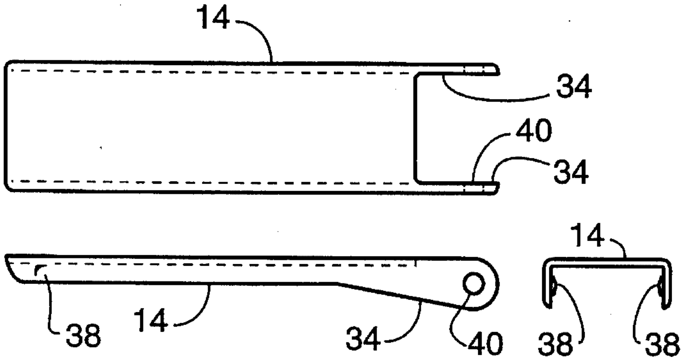
FIG. 3 is a three-view drawing of the lever bar, looking along three axes mutually at right angles.
Figure 6:
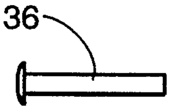
FIG. 6 is a side view of the pivot pin which hinges the lever bar to the main bar.

Referring to FIG. 1 and FIG. 3, the lever bar 14 of open box cross-section comprises at its hinged end a fork 34 perforated by pivot holes 40. The fork 34 fits over and is secured to hinge 18 by pivot pin 36 (also shown in FIG. 6) which is inserted through pivot holes 40 and hinge 18. Hinge 34 is so dimensioned that it limits the swinging motion of lever bar 14 to be perpendicular to main bar 12 when hinge 34 abuts main bar 12. At its free end lever bar 14 comprises detents 38 on its inner surface and a self-luminous band 20 on its outer surface.

Figure 2:
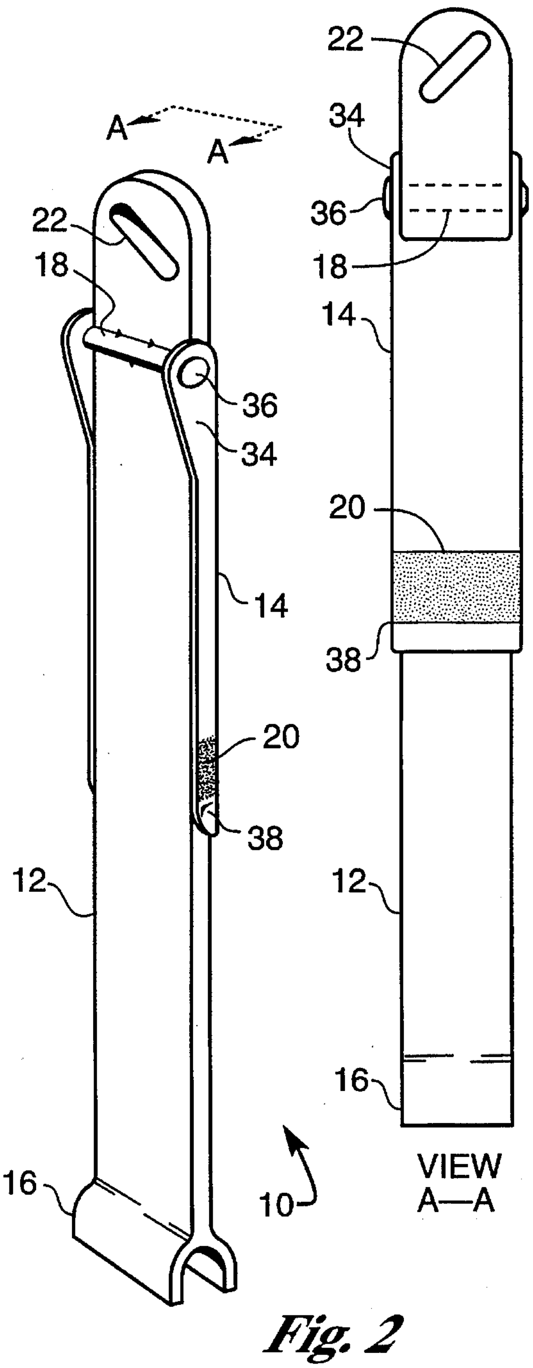
FIG. 2 is a pictorial view of the shutoff key in the folded position, plus a view in the direction A—A looking at the broad side of the folded shutoff key.

Referring to FIG. 2, the shutoff key 10 is shown in the folded position. Lever bar 14 fits snugly against and releasably grips main bar 12 by means of detents 38 on its internal surface. For convenient storage and accessibility shutoff key 10 may be suspended in the folded position as shown in View A—A from a vertical surface by a hook or nail through skew slot 22. In this position the self-luminous band 20 faces outward and permits rapid retrieval of shutoff key 10 from its stored position in the dark.

The important design criteria for this shutoff key are (1) providing adequate torque to turn off the more demanding main water valves which may be corroded, (2) maintaining the structural integrity of the key when used in both the gas and water applications up to the maximum design torque, and (3) main bar cross-sections large enough to accommodate water valve U-channels and gas valve slots to fit practical gas and water valve stems. A maximum torque in the extended position of 150 foot-pounds was chosen to cover all practical cases. To satisfy the design criteria a main bar length in the range of 1.5 to 2 feet with a cross-section width of at least 1.5 inches, a lever bar length of approximately one foot, and steel as the construction material for all components were selected. Further, the rectangular cross-section of the main bar and open box section of the lever bar provide the required torsional and flexural rigidities of these components.

Figure 4:
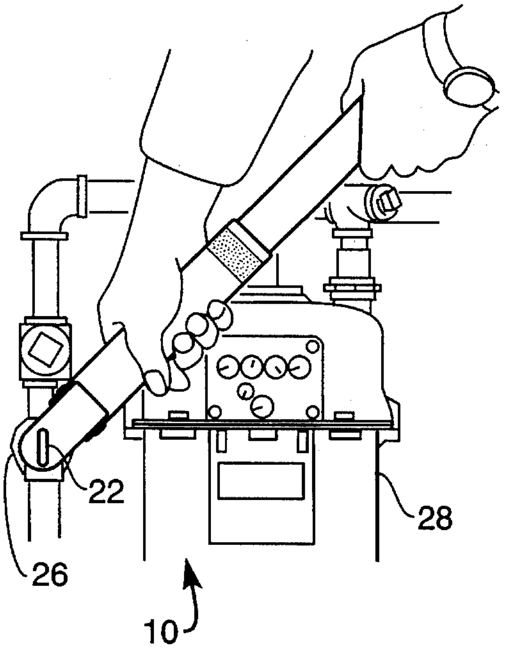
FIG. 4 is a view of the application of the shutoff key in the folded position to a main gas valve.

Now referring to FIG. 4, the application to gas shutoff is illustrated. The operator grips shutoff key 10 in the folded position at the end remote from skew slot 22 and places skew slot 22 over gas main valve stem 26 which is shown in the wide open position parallel to gas pipe 42 and in the vicinity of gas meter 28 in FIG. 4. Now a ninety-degree turn by the operator will bring stem 26 perpendicular to gas pipe 42 for shutoff. The advantage of the 45-degree skew slot 22 is that the ninety-degree turn may be executed in either direction of rotation, whichever is more conveniently accessible. To re-open the gas line after an emergency, the ninety-degree turn back to the open position is performed.

Figure 5:
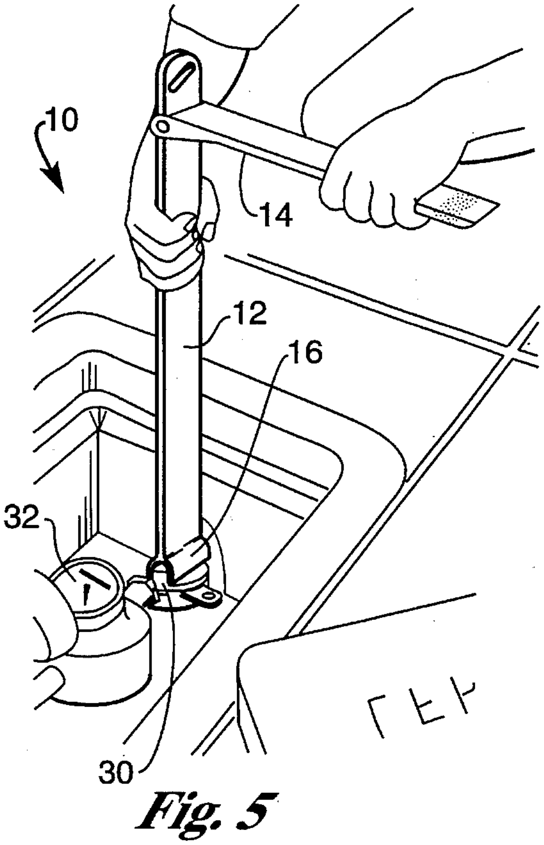
FIG. 5 is a view of the application of the shutoff key in the extended position to a main water valve.

Now referring to FIG. 5, the application to water shutoff with a below-ground water meter 32 and water main valve stem 30 is illustrated. The operator places shutoff key 10 in the extended position with U-channel 16 over up-facing stem 30, keeping main bar 112 vertical with one hand, and using the leverage of lever bar 14 with the other hand. A ninety-degree turn in either direction of rotation then shuts off the water. To re-open the water line after an emergency, the ninety-degree turn back to the open position is performed.

Other realizations of the present invention are possible without departing from the spirit and scope of the invention as delineated in the appended claims. The shapes of the U-channel and skew slot may be adapted to water and gas valve stem shapes of any kind by suitable changes in geometry and dimensions. Also, matching cross-sections of the main bar and lever bar may assume a geometry different from that shown in the Drawing. For instance, a curved, circular or tubular cross-section may be used, as long as the stated design criteria are satisfied.

We claim:

1. A utility shutoff key capable of turning both gas and water main valves, comprising:

a main bar having at one end a fixedly attached U-channel for turning a water main valve and at the other end a skew slot perforation for turning a gas main valve;

a hinge means fixedly attached to the main bar close to the skew slot perforation; and a lever bar hinged at one end to the main bar by said hinge means, with the free end of the lever bar being able to swing into a folded position into engagement with the main bar as a single unit, thereby causing the single unit to turn a gas main valve using the skew slot perforation, said lever bar being able to swing out from its folded position to an extended position perpendicular to the main bar, enabling the lever bar to act as a lever when the main bar is turning a water main valve using the U-channel.

2. The utility shutoff key of claim 1 where the length of the main bar is in the range from one-and-a-half to two feet to reach water main valves located below ground, and the length of the lever bar is approximately one foot to provide adequate leverage when the main bar is used for turning a water main valve.

3. The utility shutoff key of claim 1 where the main bar is of a rectangular cross-section, the hinge means is a hollow cylinder perpendicular to the axis of the main bar, and the lever bar is of open box cross-section so dimensioned as to be a snug fit with the main bar in the folded position.

4. The utility shutoff key of claim 1 further comprising a self-luminous band on the external surface of the lever bar when the main bar and lever bar are in the folded position during storage for rapid retrieval in the dark.

5. The utility shutoff key of claim 3, where the hinged end of the lever bar is in the form of a fork perforated by pivot holes, which fork fits over the hollow cylinder, the hinged attachment of the lever bar to the main bar being produced by a pivot pin inserted through the pivot holes in the lever bar fork and through the hollow cylinder hinge fixedly attached to the main bar.

6. The utility shutoff key of claim 3 further comprising detents in the internal surface of the open box cross-section at the free end of the lever bar to releasably grip the rectangular cross-section main bar for maintaining the folded position during storage.

7. The utility shutoff key of claim 5 where all components are constructed of steel for strength, and vinyl coated throughout to provide an inert surface which does not release toxic and combustible vapors and is not subject to arcing.

8. A method for shutting off gas and water main valves, making use of the utility shutoff key of claim 1 in a folded and in an extended position, said key having a main bar and a lever bar, comprising the steps of:

(a) removing said key from a storage location;

(b) placing said lever bar and said main bar in a folded position;

(c) grasping said folded key at the U-channel end and turning off the gas main valve with the skew slot perforation using the main bar as a lever;

(d) removing said key from the gas main valve and placing the key with the lever bar in an extended position;

(e) grasping the main bar at the skew slot perforation end and the lever bar at its free end and turning off the water main valve with the U-channel using the main bar and the lever bar for leverage;

(f) removing the key from the water main valve and placing the key with the lever bar in the folded position: and (g) placing the key back in the storage location.

* * * * *